United States Patent
Romano et al.

(10) Patent No.: US 7,593,711 B2
(45) Date of Patent: Sep. 22, 2009

(54) VEHICLE LOCATING UNIT WITH IMPROVED POWER MANAGEMENT METHOD

(75) Inventors: Frank Romano, Westborough, MA (US); Sampath Krishna, Winchester, MA (US); Son Nguyen, Marlborough, MA (US); Jesse Rhodes, Franklin, MA (US); Philip Grahame Crewe, Linton (GB); Daniel Jonathan Finchley Cletheroe, Great Shelford (GB); Mark Marsden, Saffron Walden (GB); Steven Walter Greendale, Cambridge (GB); Nigel James Watson, Whittlesford (GB); Ian Christopher Stroud, Newport (GB); Timothy David Howe, Great Shelford (GB); Gerard Edward Smith, Great Dunmow (GB)

(73) Assignee: LoJack Operating Company, LP, Westwood, MA (US)

( * ) Notice: Subject to any disclaimer, the term of this patent is extended or adjusted under 35 U.S.C. 154(b) by 831 days.

(21) Appl. No.: 11/131,847

(22) Filed: May 18, 2005

(65) Prior Publication Data

US 2006/0276160 A1 Dec. 7, 2006

(51) Int. Cl.
*H04B 1/16* (2006.01)
(52) U.S. Cl. .............. 455/343.5; 455/67.11; 455/425; 455/550.1; 370/311
(58) Field of Classification Search ............ 455/75, 455/76, 127.1, 127.5, 343.1, 343.2, 343.5, 455/550.1, 572, 574, 67.11, 425; 370/311
See application file for complete search history.

(56) References Cited

U.S. PATENT DOCUMENTS

| | | | |
|---|---|---|---|
| 4,177,466 A | 12/1979 | Reagan | |
| 4,818,988 A | 4/1989 | Cooperman et al. | |
| 4,908,609 A | 3/1990 | Stroomer | |
| 5,704,008 A | 12/1997 | Duvall, Jr. | |
| 5,917,423 A | 6/1999 | Duvall | |
| 6,229,988 B1 | 5/2001 | Stapefeld et al. | |
| 6,522,698 B1 | 2/2003 | Irving et al. | |
| 6,665,613 B2 | 12/2003 | Duvall | |
| 6,978,149 B1* | 12/2005 | Morelli et al. | 455/522 |
| 2003/0112124 A1* | 6/2003 | Gudmundsson | 340/7.38 |
| 2003/0154027 A1* | 8/2003 | Flick | 701/213 |
| 2004/0201520 A1* | 10/2004 | Flick | 342/357.07 |
| 2004/0207510 A1* | 10/2004 | Buchner | 340/5.61 |
| 2005/0258806 A1 | 11/2005 | Janik et al. | |
| 2006/0194549 A1 | 8/2006 | Janik et al. | |
| 2007/0207750 A1 | 9/2007 | Brown et al. | |

* cited by examiner

*Primary Examiner*—Nhan T Le
(74) *Attorney, Agent, or Firm*—Iandiorio Teska & Coleman

(57) ABSTRACT

A vehicle locating unit with improved power management. A receiver receives a signal from a network of communication sources. A signal strength monitoring subsystem determines which of the communication sources are transmitting the strongest signals. A power management subsystem is responsive to the signal strength monitoring subsystem and is configured to alternatively enter sleep and wake-up modes, synchronize the wake-up mode to the communication source transmitting the strongest signal, and test the signal strength of at least one additional communication source according to a predefined sequence.

13 Claims, 4 Drawing Sheets

VEHICLE LOCATING UNIT WITH IMPROVED POWER MANAGEMENT METHOD

FIELD OF THE INVENTION

This invention relates to vehicle recovery systems and, in particular, a vehicle locating unit of such a system with improved power management techniques.

BACKGROUND OF THE INVENTION

The applicant's successful and popular vehicle recovery system sold under the trademark LoJack® includes a small electronic vehicle locating unit (VLU) with a transponder hidden within a vehicle, a private network of communication towers each with a remote transmitting unit (RTU), one or more law enforcement vehicles equipped with a vehicle tracking unit (VTU), and a network center with a database of customers who have purchased a VLU. The network center interfaces with the National Criminal Information Center. The entries of that database comprise the VIN number of the customer's vehicle and an identification code assigned to the customer's VLU.

When a LoJack® product customer reports that her vehicle has been stolen, the VIN number of the vehicle is reported to a law enforcement center for entry into a database of stolen vehicles. The network center includes software that interfaces with the database of the law enforcement center to compare the VIN number of the stolen vehicle with the database of the network center which includes VIN numbers corresponding to VLU identification codes. When there is a match between a VIN number of a stolen vehicle and a VLU identification code, as would be the case when the stolen vehicle is equipped with a VLU, and when the center has acknowledged the vehicle has been stolen, the network center communicates with the RTUs of the various communication towers (currently there are 130 nationwide) and each tower transmits a message to activate the transponder of the particular VLU bearing the identification code.

The transponder of the VLU in the stolen vehicle is thus activated and begins transmitting the unique VLU identification code. The VTU of any law enforcement vehicles proximate the stolen vehicle receive this VLU transponder code and, based on signal strength and directional information, the appropriate law enforcement vehicle can take active steps to recover the stolen vehicle. See, for example, U.S. Pat. Nos. 4,177,466; 4,818,988; 4,908,609; 5,704,008; 5,917,423; 6,229,988; 6,522,698; and 6,665,613 all incorporated herein by this reference.

Since the VLU unit is powered by the vehicle's battery, power management techniques must be employed in the VLU to ensure the VLU does not drain the vehicle's battery. One prior technique employed by the applicant includes programming the VLU to "wake up" and check for messages from the communication towers only periodically, e.g., every 8 seconds for 0.2 seconds. The timing of the sleep and wake-up modes was synchronized to the transmission schedule of one communication tower. See U.S. Pat. No. 6,229,988.

But, if the vehicle equipped with the VLU so programmed moves out of the transmission range of that tower, when the VLU wakes up, no signal will be received from that tower. According to prior methods, the VLU must wake up for a longer time in order to be sure to receive a tower transmission since the VLU has no memory of which time slot the tower is likely to transmit. This results in increased power consumption.

SUMMARY OF THE INVENTION

It is therefore an object of this invention to provide a vehicle locating unit with improved power management technique.

It is a further object of this invention to provide such a vehicle locating unit whose wake-up and sleep modes are synchronized to the communication source transmitting the strongest signal.

It is a further object of this invention to provide such a vehicle locating unit which continuously updates its memory to store the identity of one or more communication towers with the strongest signals.

The subject invention results from the realization that a more effective power management subsystem for a VLU is configured to alternately enter sleep and wake-up modes, to synchronize the wake-up mode to the communication source (e.g., tower) transmitting the strongest signal, and to test the signal strength of at least one additional communication source in sequence.

The subject invention, however, in other embodiments, need not achieve all these objectives and the claims hereof should not be limited to structures or methods capable of achieving these objectives.

The subject invention features a vehicle locating unit with improved power management. A receiver receives a signal from a network of communication sources and a signal strength monitoring subsystem determines which of the communication sources are transmitting the strongest signals. The power management subsystem is responsive to the signal strength monitoring subsystem and is configured to: alternatively enter sleep and wake-up modes, synchronize the wake-up mode to the communication source transmitting the strongest signal, and test the signal strength of at least one additional communication source according to a predefined sequence.

Typically, the power management subsystem is configured to test and store the identity of two communication sources with the two strongest signals, switch to synchronization with any communication source having a signal stronger than the strongest signal of the two stored communication sources, and store the identity of any communication source with a signal stronger than the signal of any previously stored communication source.

In one embodiment, there are n (e.g., eight) communication sources each transmitting a signal at a different time every n seconds. Preferably, the power management system is configured to include a start-up mode wherein all communication sources are tested. In one preferred embodiment, the power management subsystem is implemented in a microcontroller which is configured to power down the receiver during the sleep mode and to power up the receiver during the wake-up mode. One example of a signal strength monitoring subsystem includes a demodulation circuit embodied in a transceiver.

A method of checking messages from a network of communication sources in accordance with this invention includes initially testing the signal strength of a plurality of communication sources, storing the identity of the communication sources with the two strongest signals, alternatively entering a sleep mode and a wake-up mode, the wake-up mode synchronized to the communication source with the strongest signal, testing the signal strength of one additional communication source, switching synchronization to the additional communication source if said source presents a signal stronger than the signal of the stored communication source with the strongest signal, and replacing the identity of any stored communication source if an additional communication source tested in sequence presents a signal stronger than the signal of said stored communication source.

For VLUs and other electronic receivers which receive a signal from a network of communication sources, a signal strength monitoring subsystem determines which of the communication sources are transmitting the strongest signals. A power management subsystem is responsive to the signal strength monitoring subsystem and is configured to: alternatively enter sleep and wake-up modes, synchronize the wake-up mode to the communication source transmitting the strongest signal, and test the signal strength of at least one additional communication source to ensure the wake-up mode is synchronized to the communication source transmitting the strongest signal. One embodiment features a vehicle locating unit power management system comprising a memory, and a controller configured to alternatively output sleep and wake-up mode signals, store in said memory the identity of at least a first communication source presenting the strongest signal, test the signal strength of at least one different communication source during the wake-up mode, synchronize the wake-up mode to the communication source identified in said memory, and update the memory to store the identity of a different communication source presenting a signal stronger than the first communication source.

BRIEF DESCRIPTION OF THE DRAWINGS

Other objects, features and advantages will occur to those skilled in the art from the following description of a preferred embodiment and the accompanying drawings, in which.

DISCLOSURE OF THE PREFERRED EMBODIMENT

Figure 1:
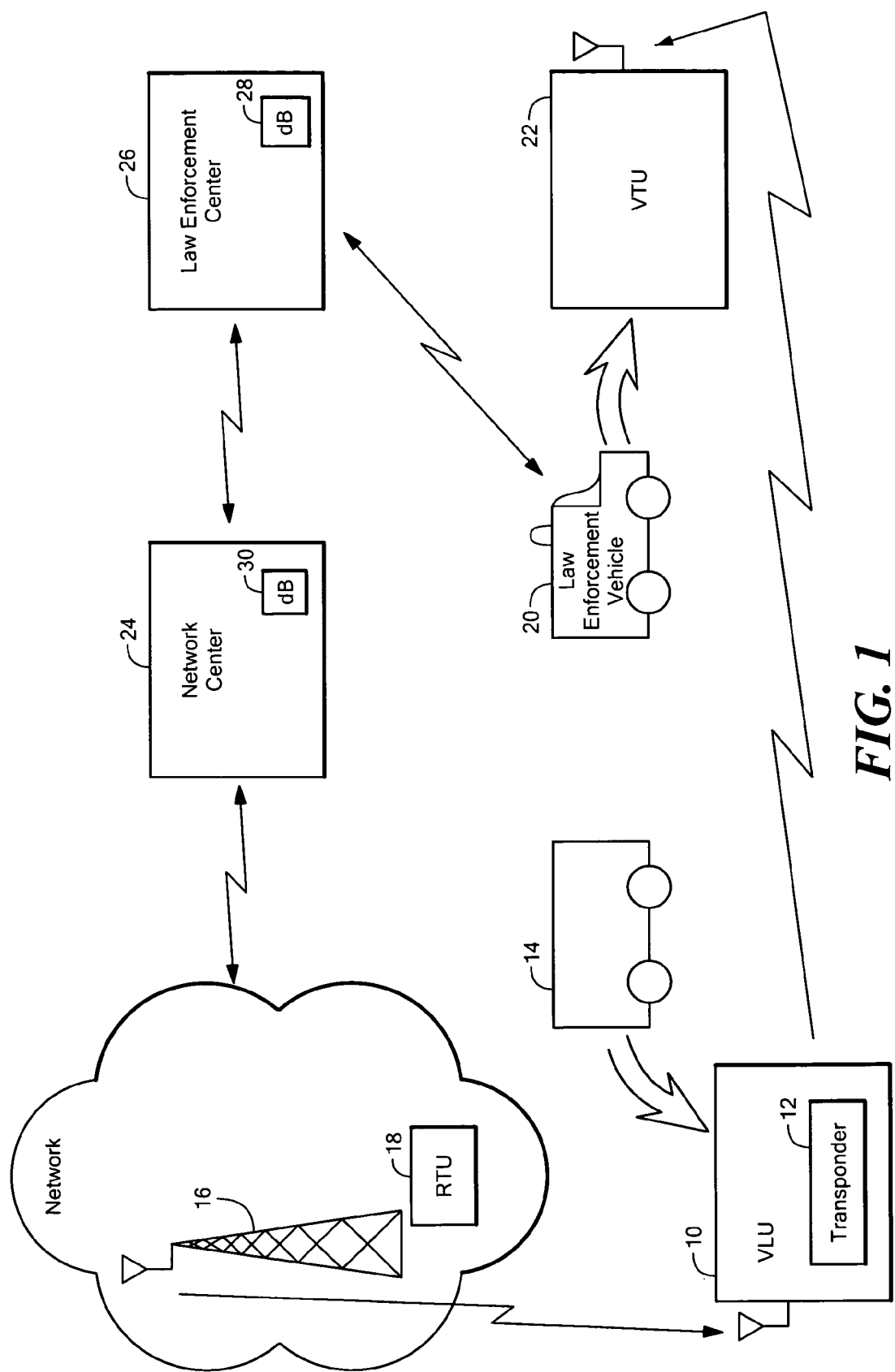
FIG. 1 is a schematic block diagram showing the primary components associated with a vehicle recovery system in accordance with the subject invention.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

As discussed in the background section above, the applicant's successful and popular vehicle recovery system sold under the trademark LoJack® includes a small electronic vehicle locating unit (VLU) 10, FIG. 1, with a transponder 12 hidden within a vehicle 14, a private network of communication towers 16 each with a remote transmitting unit (RTU) 18, one or more law enforcement vehicles 20 equipped with a vehicle tracking unit (VTU) 22, and network center 24.

When a LoJack® product customer reports that her vehicle has been stolen, the VIN number of the vehicle is reported to law enforcement center 26 for entry into database 28 of stolen vehicles. Network center 24 includes software that interfaces with database 28 of law enforcement center 26 to compare the VIN number of the stolen vehicle with database 30 of network center 24 which includes VIN numbers corresponding to VLU identification codes. When there is a match between a VIN number of a stolen vehicle and a VLU identification code, as would be the case when stolen vehicle 14 is equipped with VLU 10, network center 24 communicates with the RTUs 18 of the various communication towers 16 and each tower transmits a message to activate transponder 12 of VLU 10 bearing the particular identification code.

Transponder 12 of VLU 10 in stolen vehicle 14, once activated, begins transmitting a unique VLU identification code. VTU 22 of law enforcement vehicle 20 proximate stolen vehicle 14 receives this VLU transponder code and, based on signal strength and directional information, the appropriate law enforcement vehicle can take active steps to recover stolen vehicle 14.

Figure 2:
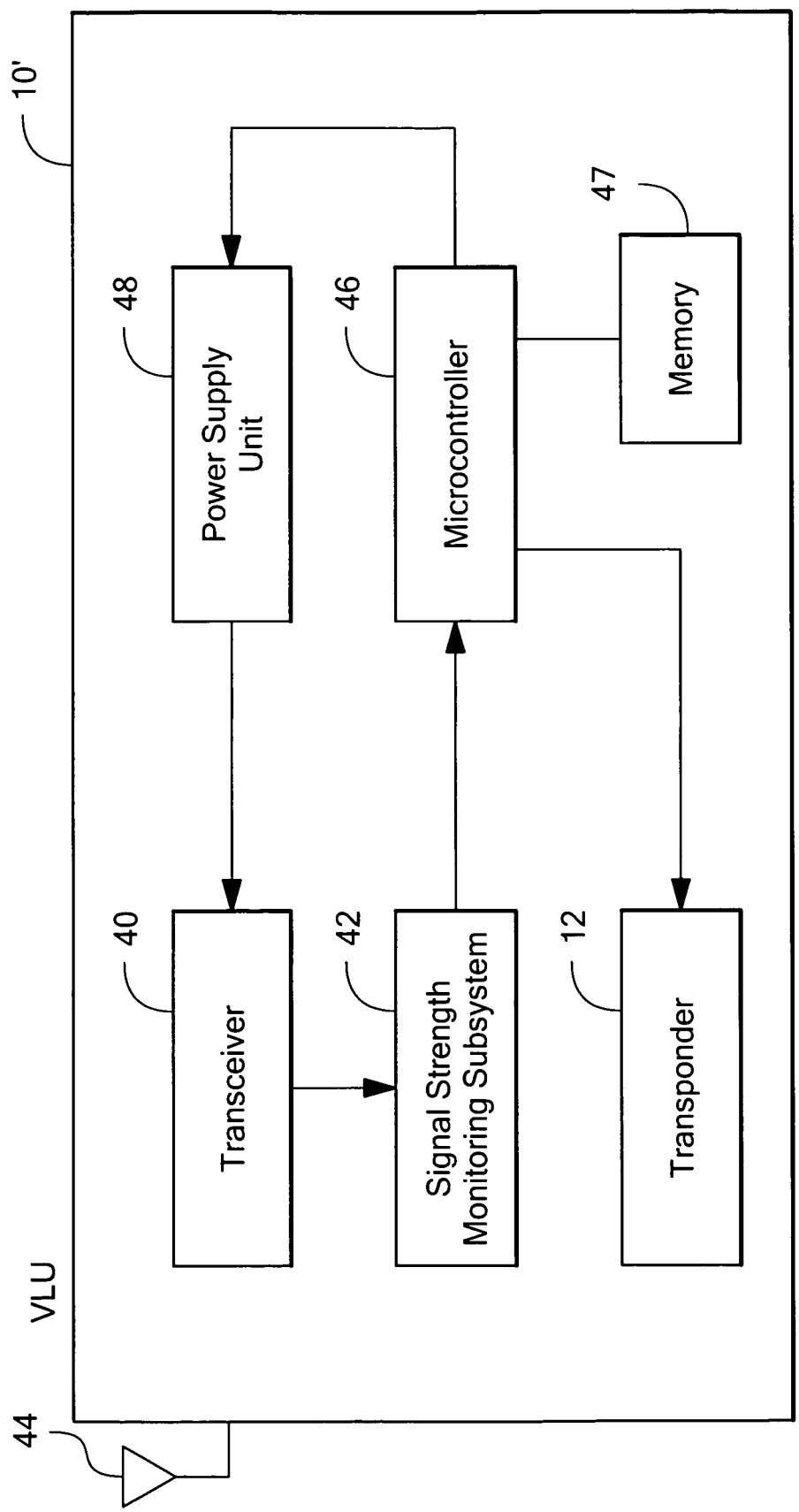
FIG. 2 is a block diagram showing the primary components associated with a vehicle locating unit in accordance with the subject invention.

VLU 10', FIG. 2, in accordance with the subject invention includes transceiver 40 or, in another example, a receiver without transmission capabilities. Signal strength monitoring subsystem 42, in one embodiment, is a demodulator circuit on a chip within transceiver 40 and outputs a signal identifying and characterizing the signal strength of all signals received by transceiver 40 via antenna 44 from the communication network and one or more communication towers 16, FIG. 1.

Figure 3:
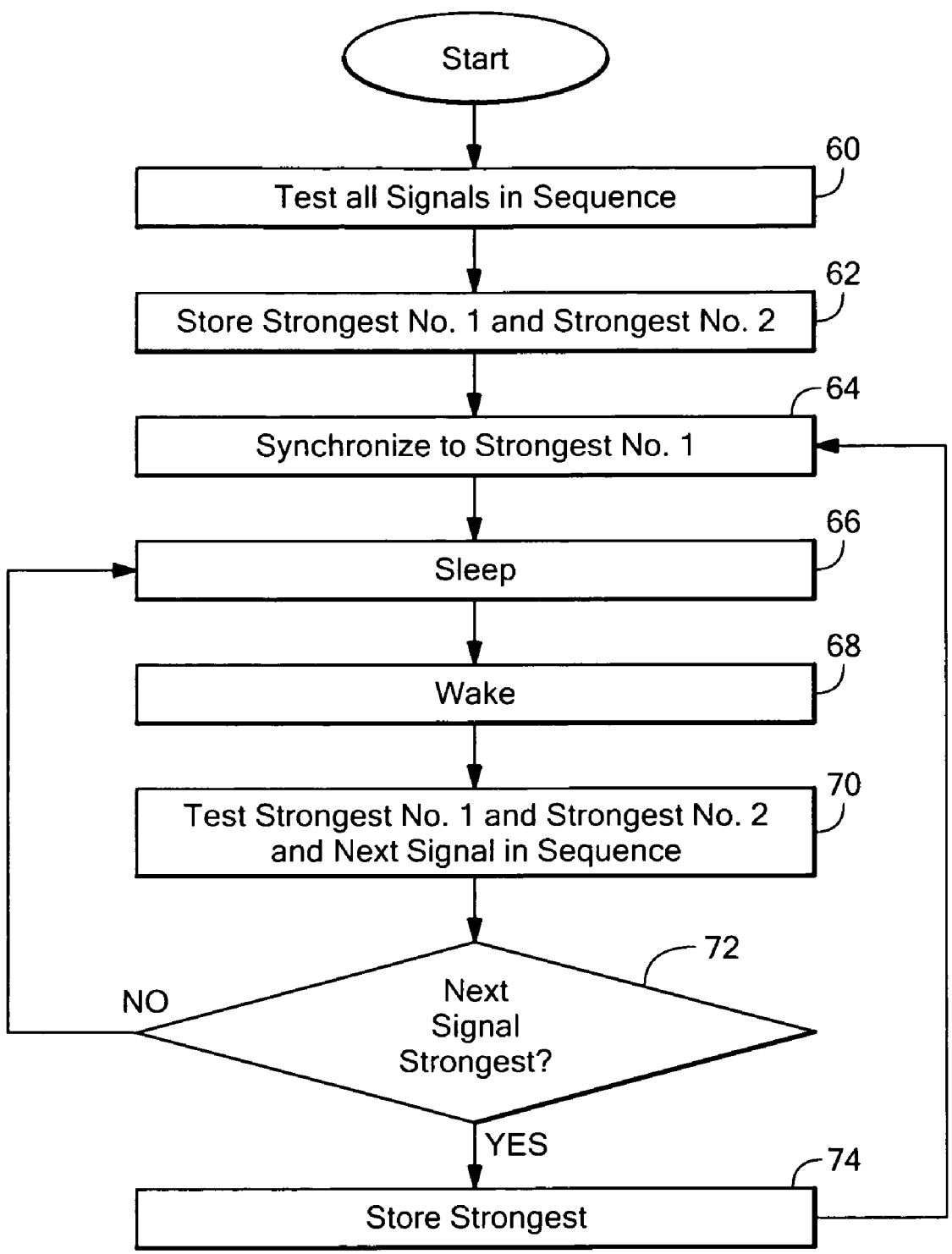
FIG. 3 is a flow chart depicting the primary steps associated with one example of the programming of the microcontroller of the vehicle locating unit shown in FIG. 2 as it relates to power management.

Microcontroller 46, FIG. 2, (e.g., a Texas Instrument microcontroller model No. MSP430) receives the output of subsystem 42, is programmed to evaluate the signal strength of all signals received by transceiver 40, and is also programmed to alternatively cause transceiver 40 to enter sleep and wake-up modes to save battery power by outputting a signal to power supply unit circuitry 48 in accordance with the flow-chart of FIG. 3. Memory 47, FIG. 2, is shown separate from controller 47 but many microcontrollers, as is known by those skilled in the art, have internal memories including the controller example above.

In the following example, there are eight communication sources or LoJack® towers A-H, FIG. 4, transmitting signals to VLU 10', FIG. 2. Each transmits a synchronization signal at a different time $t_0$-$t_7$ each eight seconds and possibly a message (in the case of a reportedly stolen vehicle) in which instance microcontroller 46, FIG. 2 would activate transponder 12.

But, transceiver 40, if continuously left on to check for such a message, would more quickly drain the battery of the vehicle. According to the subject invention, microcontroller 46 at start-up, step 60, FIG. 3, tests the signal strength of towers A-H by analyzing the output of signal strength monitoring subsystem 42. In this test mode, the signal strength of each tower is noted and if any signal carries a message, the message is acted upon.

The identity of the two strongest tower signals is stored in memory 47, FIG. 2, step 62, FIG. 3, and the wake-up mode is then synchronized, step 64, to the strongest of these two signals. Next, the sleep mode is entered and when the wake-up mode is activated in synchronization with the communication tower presenting the strongest signal, the signal strength of the two previously stored towers is tested as is the signal strength of one additional communication tower, in sequence.

Figure 4:
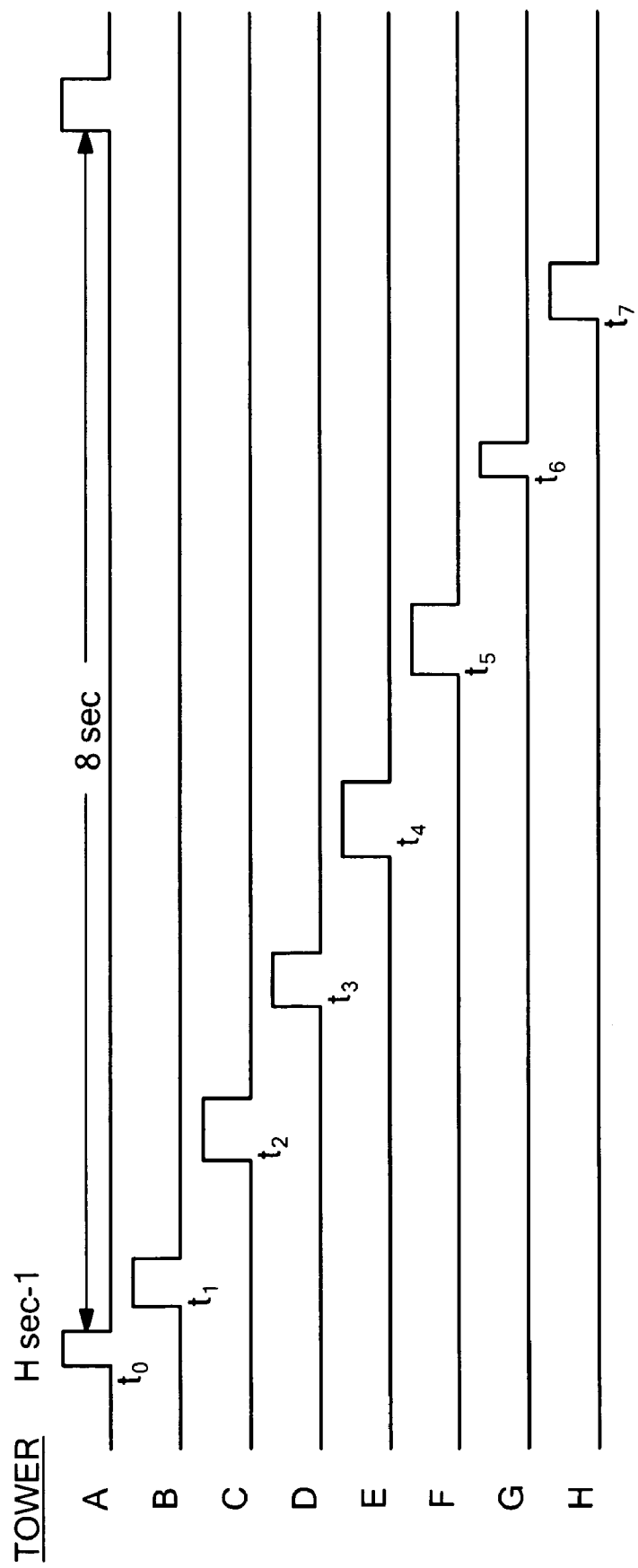
FIG. 4 is a schematic timing diagram showing a time slot synchronization pattern for an example of a communication network including eight communication towers.

As an example, suppose towers A and B, FIG. 4, are transmitting the strongest signals by virtue of their proximity to VLU 10, FIG. 2. If tower A's signal is assumed to be stronger than tower B's signal, the wake-up mode synchronization is in accordance with tower A's signal. Thus, in each cycle, (typical wake up times are 8 sec. apart), controller 46 would power up transceiver 40 by signaling power supply unit circuit 48 at time $t_0$, FIG. 4, and sleep between times $t_1$-$t_7$, steps 66-68. At the next wake-up time, the signal strength of the two previously stored towers (A and B) is tested for strength as is the signal strength of the next tower according to a predefined sequence which, in this example, is tower C, step 70. In this way, if at any time due to movement of the vehicle a different tower in the sequence A-H presents a stronger signal than a) the tower upon which controller 46 synchronizes the wake-up mode or b) the stored identity of the tower with the second strongest signal, the identity of the new tower is stored in memory 47, FIG. 2, steps 72-74, FIG. 3, and synchronization to the tower with the strongest signal is ensured at step 64.

Suppose, however, that tower C does not present a stronger signal than either towers A or B and that the wake up and sleep modes are still synchronized to tower A in step 66. At steps 68 and 70 towers A, B, and now D are tested and if tower D's signal strength is not stronger than either tower A or B and once again the sleep mode is entered, step 66. Upon entering the wake-up mode at step 68, still synchronized to tower A, the signal strength of towers A, B, and now E is checked, step 70.

Now, if the signal strength of tower E is stronger than the signal strength of tower B, but not tower A, the identity of tower E is stored in memory 47, FIG. 2 at step 74, FIG. 3, replacing tower B. But at step 64 the wake-up mode is still synchronized to the strongest tower, namely tower A at steps 64-68.

So, next, the signal strengths of towers A, E, and F are tested, step 70; and suppose at step 72 the signal strength of tower F is stronger than tower A and E but tower A is still stronger than tower E. Now, synchronization will be according to tower F at step 64 and at step 70, towers F, A, and G are tested, and so on.

In another example, imagine towers C and D initially present the strongest first and second signals to the VLU. The wake up mode is initially synchronized to tower C and the identity of towers C and D are stored in memory. After the first sleep mode, the signal strength of towers C, D, and E are tested, and next towers C, D, and F, and then towers C, D, and G, and then towers C, D, and H, and so on—one additional tower during each subsequent wake-up mode. If during this wake-up/sleep mode cycle, towers C and D remain the strongest two towers, synchronization remains with tower C and the memory continues to store the identity of towers C and D. If during the next cycle, when tower A is tested and is found to present a signal stronger than tower D but not C, the memory is updated to store the identity of towers C and A, synchronization continues according to tower C's transmission schedule, and during each subsequent wake-up mode the signal strength of towers C, A, and B; C, A, and D; C, A, and E; C, A, and F . . . and so on is tested.

In this way, the identity of the towers which transmit the two strongest signals is always stored and controller 46, FIG. 2 in sequence checks another tower in the wake-up mode to maintain in storage 47, FIG. 2, the identity of the two towers emitting the strongest signals. Also, controller 46 ensures the wake-up mode is synchronized to only the tower emitting the strongest signal. Power is conserved but now in a way which ensures no communication message from any tower in the network is missed. To enter the sleep mode, microcontroller 46 sends a signal to power supply unit 48 which then powers down transceiver 40. To enter the wake-up mode, microcontroller 46 sends a signal to power supply unit 48 which then again provides power to transceiver 40 so that it can receive signals via antenna 44.

The example presented above in reference to FIGS. 3-4 assumes eight towers in a given region, continuous storage of the two strongest tower signals, and testing of an additional tower in a specific sequence, but this is an example only and not a limitation of the subject invention: any number and combination of towers and storage of tower combinations can be used. The example above also assumes that the power management method of the subject invention applies to a VLU of a vehicle recovery system but the invention hereof may find applicability to battery powered electronic devices other than VLUs.

Thus, although specific features of the invention are shown in some drawings and not in others, this is for convenience only as each feature may be combined with any or all of the other features in accordance with the invention. Moreover, the words "including", "comprising", "having", and "with" as used herein are to be interpreted broadly and comprehensively and are not limited to any physical interconnection. Also, any embodiments disclosed in the subject application are not to be taken as the only possible embodiments. Other embodiments will occur to those skilled in the art and are within the following claims.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

What is claimed is:

1. A vehicle locating unit with improved power management, the vehicle locating unit comprising:
   a receiver which receives a signal from a network of communication sources;
   a signal strength monitoring subsystem for determining which of the communication sources are transmitting the strongest signals; and
   a power management subsystem responsive to the signal strength monitoring subsystem and configured to:
   alternatively enter sleep and wake-up modes,
   synchronize the wake-up mode to the communication source transmitting the strongest signal, and
   test the signal strength of at least one additional communication source according to a predefined sequence.

2. The vehicle locating unit of claim 1 in which the power management subsystem is configured to:
   test and store the identity of two communication sources with the two strongest signals,
   switch to synchronization with any communication source having a signal stronger than the strongest signal of the two stored communication sources, and
   store the identity of any communication source with a signal stronger than the signal of any previously stored communication source.

3. The vehicle locating unit of claim 1 in which there are n communication sources each transmitting a signal at a different time every n seconds.

4. The vehicle locating unit of claim 3 in which n is 8.

5. The vehicle locating unit of claim 1 in which the power management system is configured to include a start-up mode wherein all communication sources are tested.

6. The vehicle locating unit of claim 1 in which the power management subsystem is implemented in a microcontroller.

7. The vehicle locating unit of claim 1 in which the power management subsystem is configured to power down the receiver during the sleep mode and to power up the receiver during the wake-up mode.

8. The vehicle locating unit of claim 1 in which the signal strength monitoring subsystem includes a demodulation circuit.

9. The vehicle locating unit of claim 8 in which the demodulation circuit is a component of the receiver.

10. A system comprising:
   a receiver which receives a signal from a network of communication sources;
   a signal strength monitoring subsystem for determining which of the communication sources are transmitting the strongest signals; and
   a power management subsystem responsive to the signal strength monitoring subsystem and configured to:
      alternatively enter sleep and wake-up modes,
      synchronize the wake-up mode to the communication source transmitting the strongest signal, and
      test the signal strength of at least one additional communication source to ensure the wake-up mode is synchronized to the communication source transmitting the strongest signal.

11. A vehicle locating unit with improved power management, the vehicle locating unit comprising:
   a receiver which receives a signal from a network of communication sources;
   a signal strength monitoring subsystem for determining which of the communication sources are transmitting the strongest signals; and
   a power management subsystem responsive to the signal strength monitoring subsystem and configured to:
      test and store the identity of two communication sources with the two strongest signals,
      alternatively enter sleep and wake-up modes, the wake-up mode synchronized with the communication source transmitting the strongest signal,
      test the signal strength of at least one additional communication source according to a predefined sequence,
      switch to synchronization with any communication source having a signal stronger than the strongest signal of the two stored communication sources, and
      store the identity of any communication source with a signal stronger than the signal of any previously stored communication source.

12. A vehicle locating unit power management system comprising:
   a memory; and
   a controller configured to:
      alternatively output sleep and wake-up mode signals,
      store in said memory the identity of at least a first communication source presenting the strongest signal,
      test the signal strength of at least one different communication source during the wake-up mode,
      synchronize the wake-up mode to the communication source identified in said memory, and
      update the memory to store the identity of a different communication source presenting a signal stronger than the first communication source.

13. A vehicle locating unit with improved power management, the vehicle locating unit comprising:
   a receiver which receives a signal from a network of communication sources;
   a signal strength monitoring subsystem for determining which of the communication sources are transmitting the strongest signals; and
   a power management subsystem responsive to the signal strength monitoring subsystem and configured to:
      test and store the identity of two communication sources with the two strongest signals,
      switch to synchronization with any communication source having a signal stronger than the strongest signal of the two stored communication sources, and
      store the identity of any communication source with a signal stronger than the signal of any previously stored communication source.

\* \* \* \* \*